US005156874A

United States Patent [19]

Switek, Jr.

[11] Patent Number: 5,156,874
[45] Date of Patent: Oct. 20, 1992

[54] METHOD FOR SLICING BROCCOLI AND THE LIKE INTO SPEARS

[76] Inventor: Robert E. Switek, Jr., 7059-I Commerce Cir., Pleasanton, Calif. 94588

[21] Appl. No.: 785,414

[22] Filed: Oct. 21, 1991

Related U.S. Application Data

[62] Division of Ser. No. 576,675, Aug. 31, 1990.

[51] Int. Cl.$^5$ .......................... A23P 1/00; B26D 7/00
[52] U.S. Cl. ..................................... 426/518; 83/409; 83/431
[58] Field of Search .................. 426/518, 481; 99/537, 99/538, 567, 576, 635, 636, 637, 638, 642, 643; 83/404.2, 155, 409, 431

[56] References Cited

U.S. PATENT DOCUMENTS

| | | | |
|---|---|---|---|
| 3,380,500 | 4/1968 | Alpen | 99/637 |
| 3,646,977 | 3/1972 | Goodale | 99/643 |
| 3,690,049 | 9/1972 | Roberson | 99/643 |
| 3,724,470 | 8/1973 | Console | 99/538 |
| 3,886,857 | 6/1975 | Goodale | 99/642 |
| 3,907,101 | 9/1975 | Tomelleri | 99/636 |
| 4,095,391 | 6/1978 | Anguiano | 100/6 |
| 4,211,161 | 7/1980 | Jourdan et al. | 99/638 |
| 4,420,118 | 12/1983 | Gehlen | 198/624 |
| 4,601,156 | 7/1986 | Parry et al. | 53/585 |
| 4,674,270 | 6/1987 | Tonus | 53/585 |
| 4,773,324 | 9/1988 | Wylie et al. | 99/638 |

Primary Examiner—George Yeung
Attorney, Agent, or Firm—Schapp and Hatch

[57] ABSTRACT

A method, apparatus and system for slicing broccoli and the like into relatively uniform spears suitable for packing and freezing by grasping the stem end of the broccoli in clamping jaws with the main portion of the broccoli head depending vertically, moving a plurality of slicing knives upwardly to slice through said main portion, and severing the stem portion from the sliced portion to provide spears of similar size and shape. The heads of broccoli move along a feed conveyor and erecting means to a transfer station where their stem ends are grasped by clamping jaws carried on a rotary turntable in vertical alignment with a slicing knife assembly reciprocable vertically in response to the rotation of the turntable. A rotary knife severs the stem ends from the spears which drop onto a discharge conveyor. All of the described actions occur as the broccoli moves at a constant uniform speed through the slicing machine. The system provides multiple slicing machines arrayed along a supply conveyor, with each machine accomodating a specific size range of broccoli heads, and being adjustable to different size ranges. Intermixed broccoli heads of varying sizes are manually transferred from the supply conveyor to the feed conveyors of the correct slicing machines for the size of the broccoli head.

4 Claims, 11 Drawing Sheets

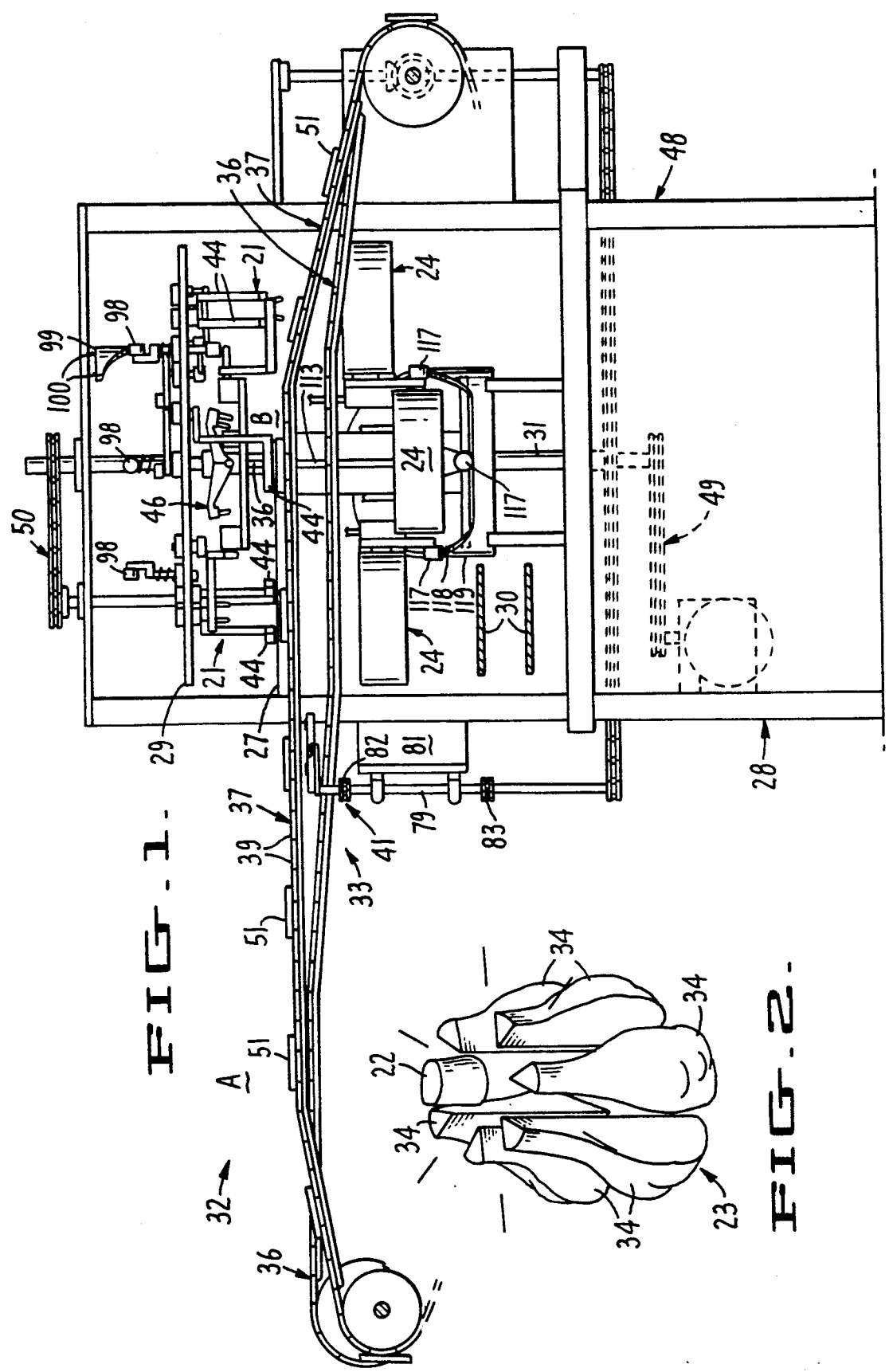

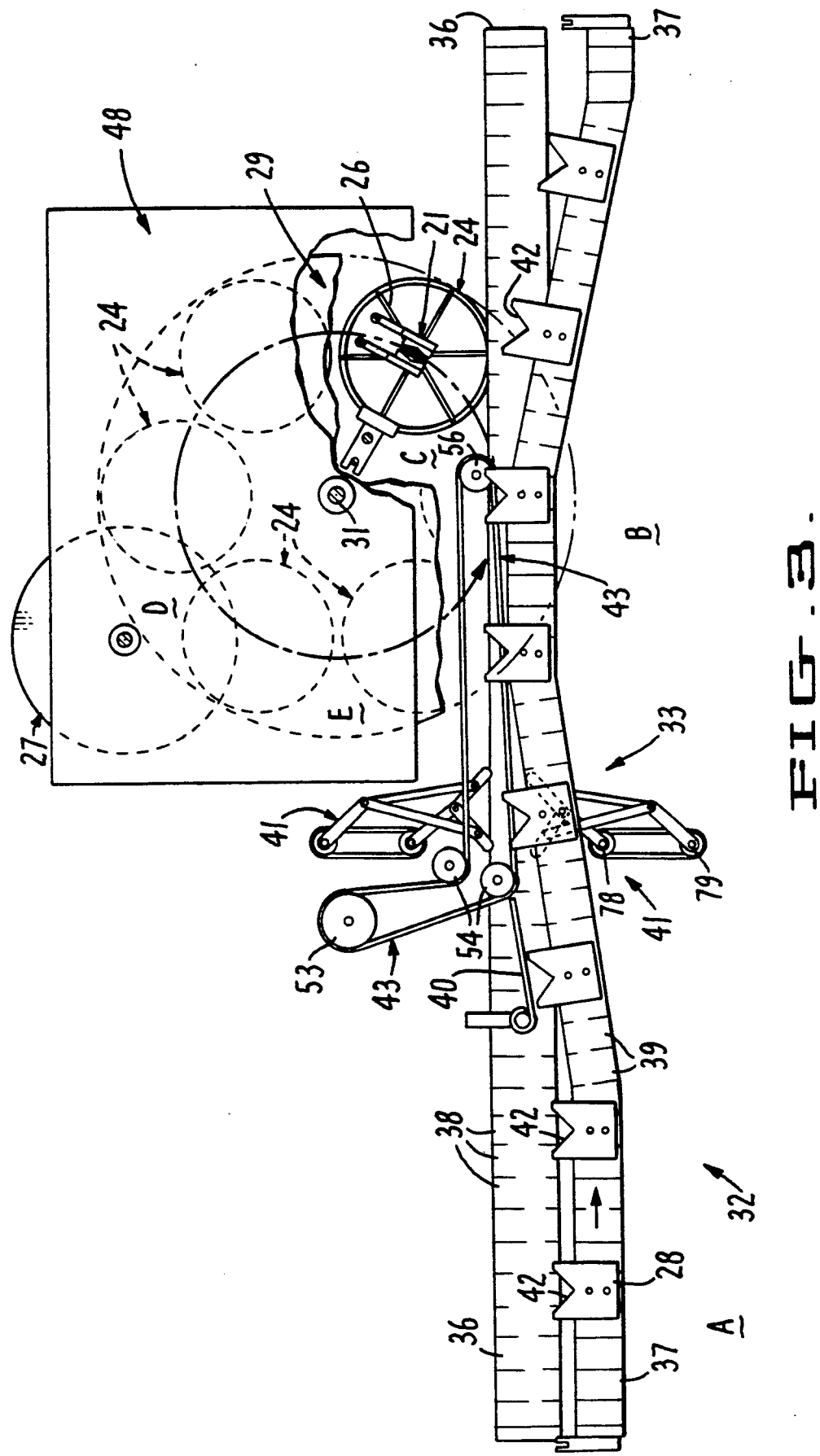

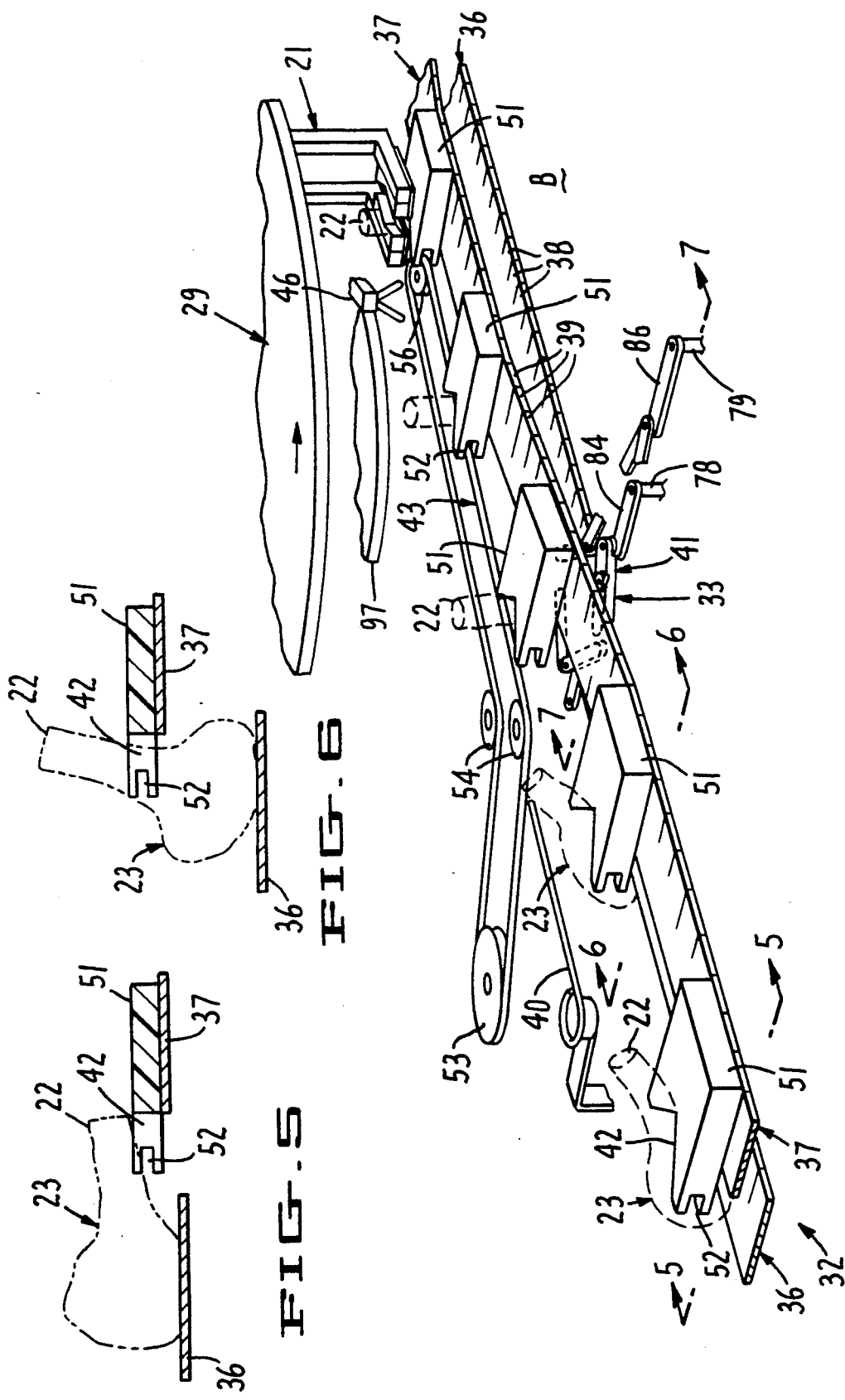

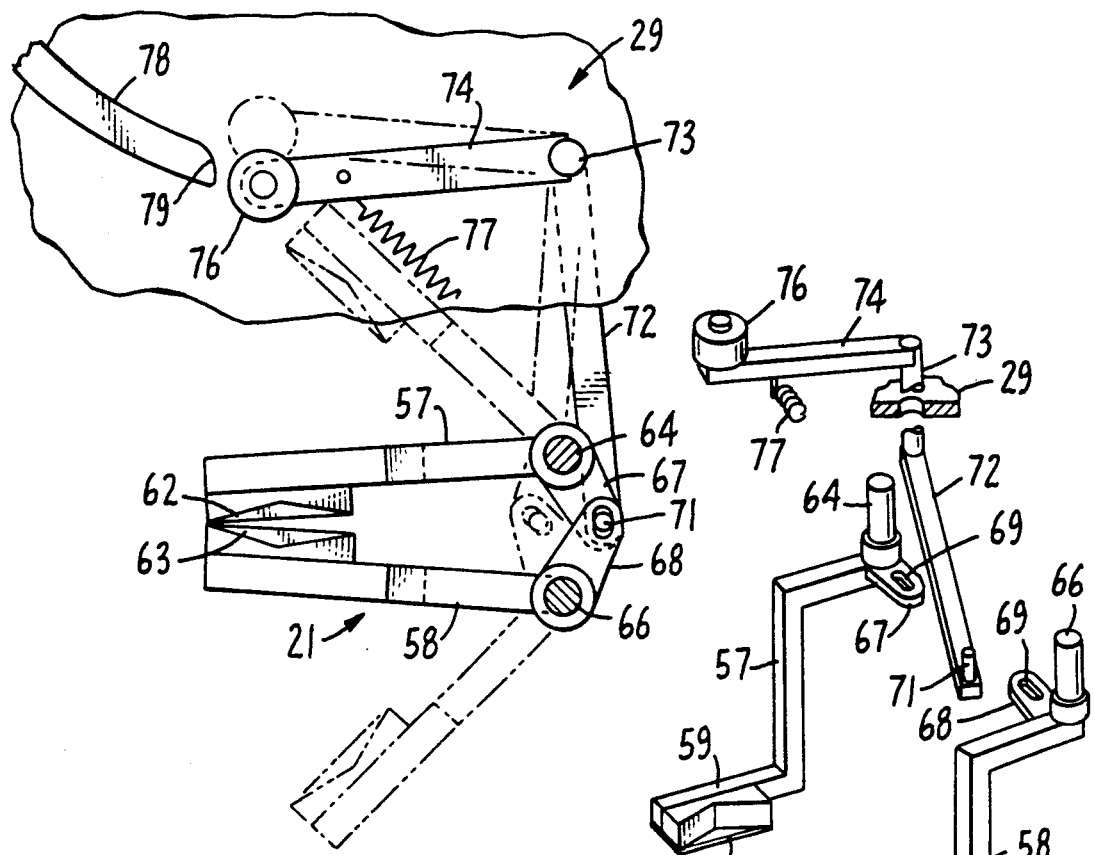
FIG. 12
FIG. 14
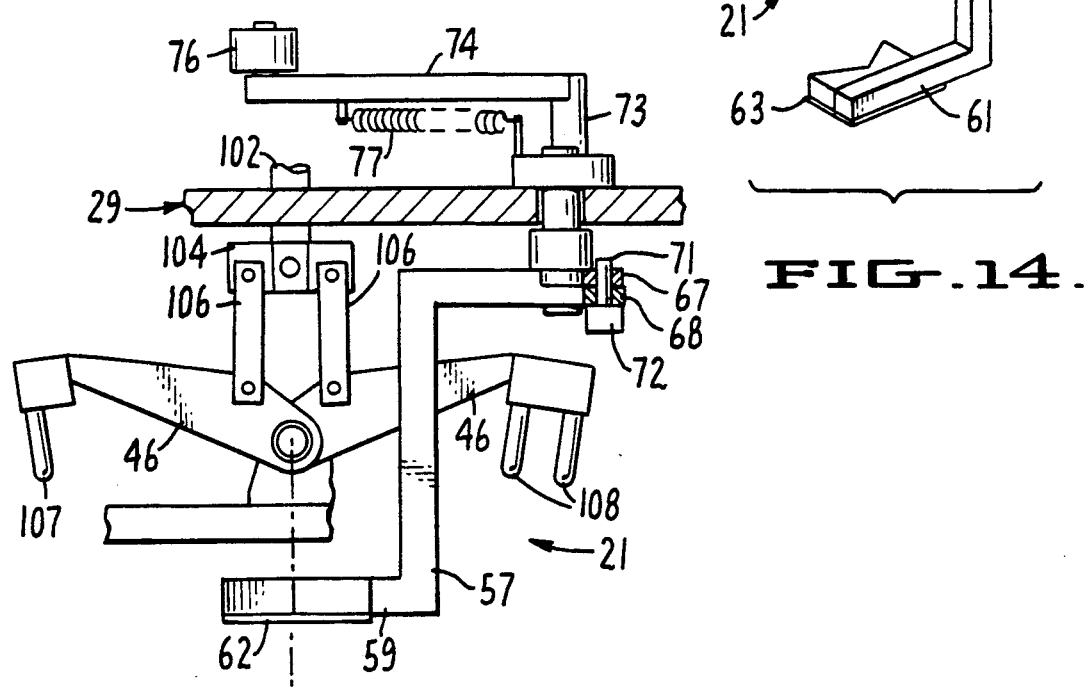
FIG. 13

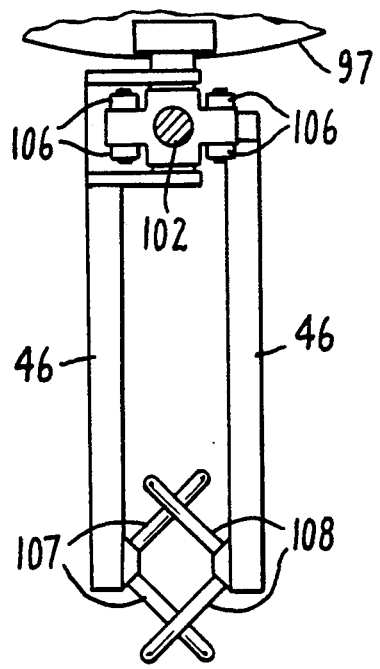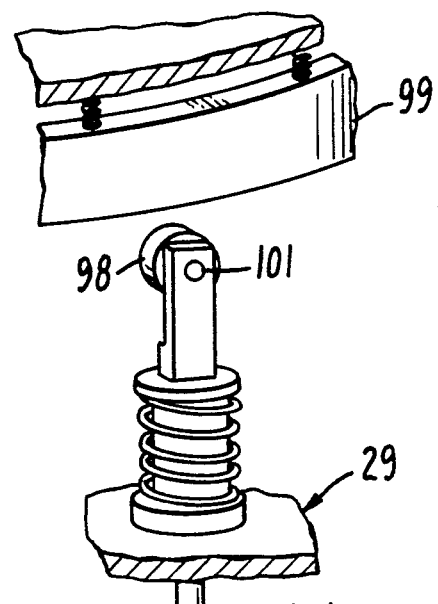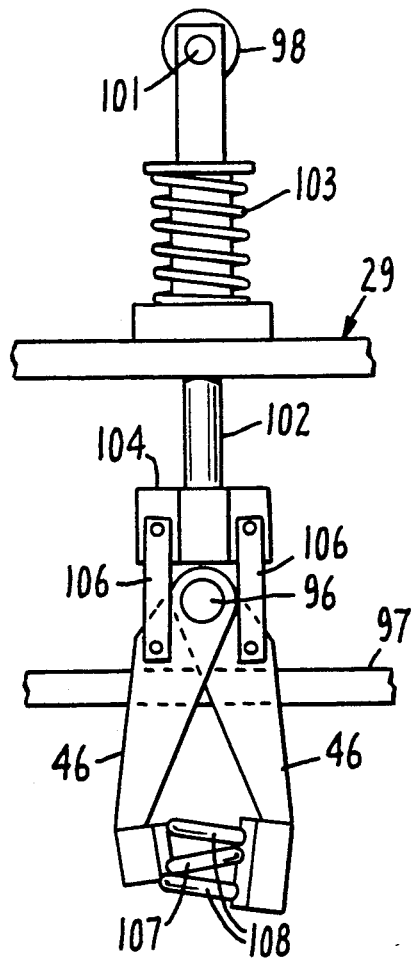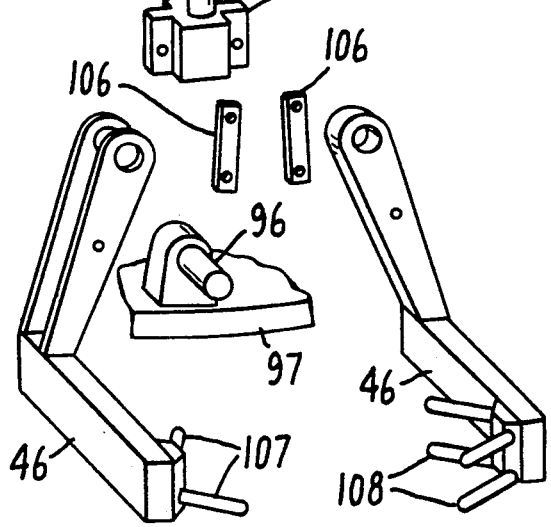
FIG. 15.
FIG. 16.
FIG. 17.

METHOD FOR SLICING BROCCOLI AND THE LIKE INTO SPEARS

This is a divisional of co-pending application Ser. No. 07/576,675 filed on Aug. 31, 1990.

BACKGROUND OF THE INVENTION

1. Field of the Invention

This invention relates to methods and apparatus for longitudinal slicing of vegetables and fruits, and more particularly to a system and equipment for slicing large quantities of different size heads of broccoli into spears suitable for packaging and freezing.

2. Description of the Prior Art

In modern food packaging, it is often necessary to slice individual vegetables and fruits lengthwise into a plurality of spears of similar size and shape. This is particularly difficult when the vegetables or fruits are of uneven size and configuration, such as broccoli, cauliflower, and the like.

Traditionally, slicing of the vegetable or fruit into longitudinal spears has been accomplished manually by a series of workers who grasp the vegetable or fruit and wield a straight knife or cleaver to make longitudinal cuts angularly related to each other. This method of slicing the units into spears is extremely labor-intensive, and the similarity of the configuration of the spears depends in large part upon the skill of the worker.

Various machines have been proposed for reducing labor costs by eliminating manual slicing. These machines are intended to accomplish automatic slicing of the heads of broccoli and the like into a plurality of spears. Most of these machines merely quarter the head of broccoli and do not reduce the larger heads into spears small enough for freezing and packaging. The machines which do slice the broccoli heads into more than four pieces do not make the slices of similar size and shape. This is partially because the slicing blades are not accurately oriented with respect to the central longitudinal axis of the head of broccoli.

Broccoli slicing machines which grip the head of broccoli between moving resilient surfaces as they are sliced longitudinally and the butt ends of the stalks removed are shown in U.S. Pat. No. 4,455,929 issued Jun. 26, 1984 to Khosrow Goudarzi et al.; U.S. Pat. No. 3,478,794 issued Nov. 18, 1969 to Cecil W. Alpen; and U.S. Pat. No. 3,478,795 issued Nov. 18, 1969 to Herman F. Thornsbery.

Other broccoli slicing machines carry the heads of broccoli in erect position, with the flower end up, in individual pockets carried along an endless conveyor, and the heads of broccoli are sliced by a knife lowered down from above. Typical of these patents are U.S. Pat. No. 4,168,642 issued Sep. 25, 1979 to Owen H. Evans; and U.S. Pat. No. 3,695,323 issued Oct. 3, 1972 to Yngve R. Akesson et al.

Other broccoli slicing and trimming machines grasp the head of broccoli in a rotary indexing device which advances the head of broccoli to a series of circumferentially spaced stops, with cutting, slicing and trimming operations being accomplished at such stops.

Typical indexing devices are found in U.S. Pat. No. 4,658,714 issued Apr. 21, 1987 to Jack R. McIlvain et al, which grasps the head of broccoli by its flower end as it indexes the broccoli head from stop to stop, and U.S. Pat. No. 4,773,324 issued Sep. 27, 1988 to John V. Wylie et al which inverts the broccoli head and grasps it between opposed jaws at a receiving position. The head of broccoli is then indexed to a slicing device and is stopped while a pneumatic cylinder forces a multiple blade knife upwardly to slice the flower end of the head of broccoli. The head of broccoli is indexed to the next stop where a rotary knife slices off the stem end of the stalk above the gripping jaws. The broccoli is halted at still another stop where a cup-shaped, sharp rimmed cutter makes a hemispherical slice to remove the florets from the stalk. U.S. Pat. No. 3,646,977, issued Mar. 7, 1972 to Richard J. Goodale, shows a device which indexes to stopped positions and uses two separately orbiting pointed knives to stab through the broccoli and then cut down through the head.

Other patents showing apparatus for bunching broccoli and cutting off the ends, but not longitudinally slicing the broccoli, are U.S. Pat. No. 4,480,536 issued Nov. 6, 1984 to Daniel E. Burns, and U.S. Pat. No. 4,041,672 issued Aug. 16, 1977 to David L. Guarte.

The indexing machines are much too slow for high quantity production, and are very hard on both the broccoli and the machine when operated at higher speeds. I have found that each of the prior art machines discussed above, and the methods by which they operate, can be materially improved upon by the system, method and apparatus of the present invention.

The above-listed patents are believed to be relevant to the present invention because they were adduced by a prior art search made by an independent searcher, and a copy of each of the above-listed patents are supplied to the Patent and Trademark Office herewith.

SUMMARY OF THE INVENTION

The machine of the present invention, formed for longitudinally slicing elongated vegetables and fruits into spears of similar size and shape, provides clamping jaw means formed for grasping the stem end of a head of broccoli or the like with the major portion thereof depending from the stem end, slicing means having one or more knife blades moveable upwardly toward the clamping jaw means for slicing through the major portion of the broccoli head, cutting means for severing the stem end from the sliced portion of the broccoli head, and drive means formed for operating the jaw means, the slicing means, and the cutting means in sequence so as to move the broccoli head continuously through the machine at a constant speed.

With each of the described means operating in synchronism so that the grasping, slicing, and cutting operations are all accomplished as the broccoli head is being moved at a constant rate of travel through the machine without abrupt stops and starts, it is possible to operate the machine at high rates of speed producing large amounts of usable broccoli spears with comparatively little wastage.

In the present machine, the clamping jaw means and the slicing means are mounted in vertically aligned relation for joint rotational movement on a horizontal turntable which is revolved at constant speed by the drive means. The machine further includes conveyor means formed for receiving the heads of broccoli and transporting them in one at a time order, at the same constant speed, to the clamping jaw means. Also provided is erecting means associated with the conveyor means and formed for erecting the heads of broccoli on the conveyor means to inverted position resting on their enlarged flower ends, and with their stem ends uppermost in position to be grasped by the jaw means.

The slicing means preferably provides a plurality of straight knife blades angularly related to each other for providing a plurality of angularly related longitudinal slices through the major portion of the broccoli head so as to form a plurality of spears of relatively similar size and shape.

The conveyor means includes a first elongated conveyor formed for receiving the broccoli heads and transporting them on their flower ends from a receiving station to a transfer station, together with a second elongated conveyor extending from a position generally laterally spaced from the first conveyor at the receiving station to a position spaced generally above the first conveyor at the transfer station for erecting the inverted heads of broccoli laterally as they approach the transfer station.

The machine further provides articulated finger means extending between the first and second elongated conveyors between the receiving station and the transfer station, the finger means being formed for aligning each of the heads of broccoli fore and aft of the conveyors with the longitudinal axis of the broccoli head upright and its stem end on top. In a modified form of the invention, the fore and aft aligning is accomplished by confronting spaced wedges on the first conveyor.

The second elongated conveyor is preferably formed with a plurality of notches facing toward the first elongated belt conveyor and adapted for receiving and removably supporting the stem end of the head of broccoli during movement thereof from the receiving station to the transfer station. Flexible driven belt means extends horizontally from the articulated finger means to the transfer station and is cooperative with the notches in the second elongated conveyor for further aligning and holding the broccoli heads in upright inverted position on the first elongated belt conveyor as they are moved to the transfer station.

The clamping jaw means includes a pair of clamping jaw members actuated by rotation of the turntable for lateral clamping movement against opposite sides of the stem end of the broccoli head at the transfer station. The clamping jaw menas also includes a pair of aligning jaws formed for lateral movement toward each other against opposite sides of the major portion of each of the heads of broccoli for holding such heads in upright inverted position as the clamping jaws engage the stem end of the broccoli.

The slicing means is reciprocated vertically, in response to the rotation of the clamping jaw means and the slicing means on the turntable, through a slicing station which is angularly displaced from the transfer station, camming means being provided on the slicing means for effectiing such vertical reciprocation of the slicing means upon the rotary movement of the turntable carrying the slicing means through the slicing station.

The cutting means provides a knife member rotatable in a horizontal plane and positioned in the path of movement of the head of broccoli for severing the longitudinally sliced major portion from the stem end gripped by the jaw means.

The turntable is mounted for rotation on a supporting frame and is rotated at a constant selected speed by the drive means in synchronism with the movement of the conveyor means and the operation of the erecting means, and the articulated finger means, and the clamping jaw means.

The clamping jaw means further utilizes alignment retaining jaws actuated by the rotary movement of the turnable to move toward each other against the head of broccoli for holding same in inverted position with its stalk extending vertically and with the stem end grasped by the clamping jaw means.

The slicing means is carried on the turntable for vertical reciprocation, in alignment with the clamping jaw means, between a level below the head of broccoli at the transfer station and a level just below the jaw means at the slicing station.

As an important feature of the present invention, the described slicing machines are adapted for use in a multiple slicing machine system capable of accepting heads of broccoli of intermixed different sizes and slicing such different size broccoli heads into a plurality of elongated spears suitable for packaging and freezing. To this end each of the slicing machines is formed for receiving and slicing a specific size range of broccoli heads into spears of similar size and shape. Preferably, at least some of the slicing machines are adjustable to accomodate different size ranges of broccoli heads.

Conveniently, a plurality of the slicing machines are positioned in a row along an elongated supply conveyor adapted for carrying heads of broccoli of intermixed different sizes to a plurality of spaced workstations, with a slicing machine at each workstation capable of slicing broccoli heads of a designated range of sizes. One at a time transfer of the correct size heads from the supply conveyor to the feed conveyors of the correct machine is accomplished manually by workers at the workstations.

The clamping jaw means of the slicing machine is adjustable as to the spacing between the clamping jaws for gripping different size ranges of broccoli stem ends. The slicing means is adjustable as to the number and circumferentially angular relation of the vertical slices through the flower end of the head of broccoli for adjusting the number and shape of the spears sliced from a particular size range of broccoli heads.

The described structure of the broccoli slicing machines makes it possible to construct a rapid system for longitudinally slicing elongated fruits or vegetables, such as broccoli, into a plurality of spears of suitable uniformity for packaging and freezing. This system provides a plurality of the described broccoli slicing machines, each of which is formed for receiving and slicing heads of broccoli in a specific size range into a plurality of longitudinal spears of similar size and shape, together with means for feeding broccoli heads in the correct size range to each of the machines for slicing.

When the broccoli arrives at the packing plant from the fields where it is grown and harvested, the various heads are not uniform in size or shape. Prior machines have not been adjustable to accomodate the wide variety of sizes of heads normally encountered in field grown broccoli. In the system of the present invention, at least some of the plurality of slicing machines are adjustable to accomodate different size ranges of broccoli heads. Adjustment of the slicing machines to work effectively on different sizes of broccoli heads is accomplished by varying the number and angular relation of the slicing blades for adjusting the number, shape and size of the sliced spears produced by the slicing machine. The clamping jaws and the aligning and erecting means are also adjustable for similar reasons.

The method of the present invention utilizes the steps of inverting the broccoli head with its stem end uppermost, mechanically grasping the stem end with the major portion of the broccoli head depending vertically therefrom, urging angularly related sharp knife blades upwardly to slice vertically through the major portion, cutting horizontally through the head of broccoli through the upper end of the vertical slices made by the knife blades for separating the sliced major portion from the stem end, and thereafter releasing the stem end where it will not fall onto the broccoli spears.

It is therefore a principal object of the present invention to provide a system and machine capable of longitudinally slicing elongated vegetable and fruit units into spears of substantially uniform size and shape suitable for packing and freezing.

Another object of the present invention is to provide a machine of the character described which is particularly adapted for longitudinally slicing heads of broccoli and the like into substantially uniform spears.

A further object of the present invention is to provide a machine of the character described capable of receiving heads of broccoli and the like lying on their side and thereafter erecting such heads to an inverted position with their stem ends uppermost for mechanical grasping.

A still further object of the present invention is to provide a machine of the character described in which the heads of broccoli and the like progress rapidly through the machine at a constant selected speed, and the various operations of transporting, erecting, aligning, mechanically grasping the stem end, vertically slicing upwardly through the broccoli head, and cutting to separate the sliced spears from the stem end, are all accomplished smoothly while the heads of broccoli are moving through the machine at a constant selected speed.

Yet another object of the present invention is to provide a machine of the character described having lineal conveyors feeding the inverted heads of broccoli in one at a time order to jaw means carried on a horizontal turntable which rotates at a speed synchronous with the speed of the conveyors.

Another object of the present invention is to provide a machine of the character described in which the rotating turntable is journaled in a supporting frame, and the jaw means, slicing means and cutting means are all controlled by cams mounted on the frame coaxially with the turntable.

A further object of the present invention is to provide a system utilizing multiple slicing machines of the character described in which the system and slicing machines are capable of accepting and slicing broccoli heads of different size ranges.

A still further object of the present invention is to provide a system of the character described in which at least some of the slicing machines are adjustable to accomodate and slice broccoli heads in different and various specific size ranges.

Other objects and features of advantage will become apparent as the specification proceeds and from the claims.

BRIEF DESCRIPTION OF THE DRAWINGS

FIG. 1 is a side elevational view of a machine constructed in accordance with the present invention.

FIG. 2 is an exploded perspective view illustrating the manner in which a head of broccoli or the like is sliced and cut into a plurality of similar spears suitable for freezing.

FIG. 3 is a plan view of the machine of FIG. 1.

FIG. 4 is an enlarged, fragmentary perspective view of the portion of the machine of FIG. 1 which receives the heads of broccoli, erects them to inverted position, and moves them to a transfer station where the upper stem end of the broccoli is grasped by jaw means.

FIG. 5 is a vertical cross-sectional view taken substantially on the plane of Line 5—5 of FIG. 4.

FIG. 6 is a vertical cross-sectional view taken substantially on the plane of Line 6—6 of FIG. 4.

FIG. 12 is a vertical plan view of a clamping jaw means illustrating its open and shut positions.

FIG. 13 is a side elevational view of the clamping jaw means of FIG. 12 and further illustrating a pair of aligning jaw members associated therewith for holding the broccoli steady as it is grasped by the jaw means and sliced by the slicing means.

FIG. 14 is an exploded perspective view of the jaw means of FIGS. 12 and 13.

FIG. 15 is a plan view of the aligning jaw members of FIG. 13 shown in fully closed position.

FIG. 16 is a side elevational view of the apparatus of FIG. 15.

FIG. 17 is an exploded perspective view of the apparatus of FIGS. 15 and 16.

Figure 7:
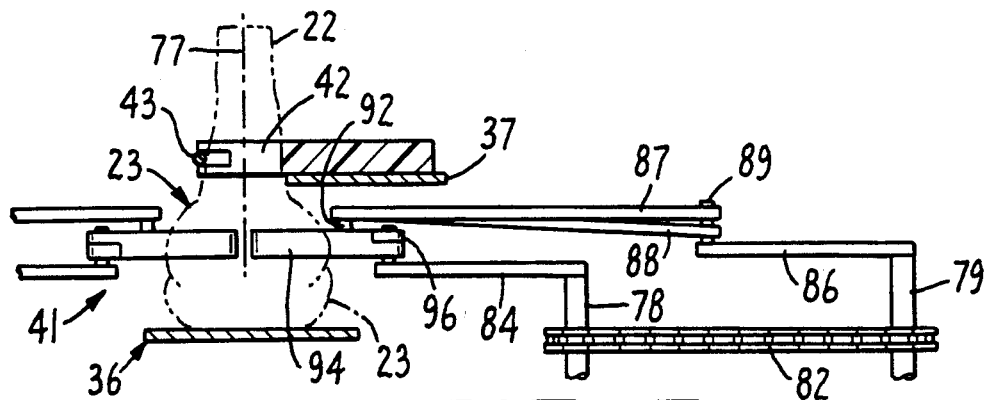
FIG. 7 is a vertical cross-sectional view taken substantially on the plane of Line 7—7 of FIG. 4.

While only the preferred forms of the invention are illustrated in the drawings, it will be apparent that various modifications could be made without departing from the ambit of the claims.

DESCRIPTION OF THE PREFERRED EMBODIMENTS

The machine of the present invention for longitudinally slicing elongated vegetables and fruits into spears provides clamping jaw means 21 formed for grasping the steam end 22 of individual vegetables and fruits with the major portion 23 thereof depending from the stem end 22, slicing means 24 having a knife blade 26 movable upwardly toward the clamping jaw means 21 for slicing upwardly through the major portion 23 of the fruit or vegetable, cutting means 27 formed for severing the stem end 22 from the major portion 23 after the latter has been sliced, and drive means 28 formed for operating the clamping jaw means 21 and the slicing means 24 and the cutting means 27 in sequence to move the individual vegetables and fruits continuously through the machine at a constant speed.

The clamping jaw means 21 and slicing means 24 are mounted in vertically aligned relation on a turntable 29 rotated at constant speed by the drive means 28. Turntable 29 is here mounted for rotation in a horzontal plane on a vertically extending shaft 31 connected with the drive means 28.

The individual fruits and vegetables are delivered in one at a time order to the clamping jaw means 21 by a conveyor means 32, the individual fruits and vegetables being placed in lying down attitude as shown in FIG. 5 of the drawings, and erecting means 33 associated with the conveyor means 32 is formed for erecting the individual fruits and vegetables on the conveyor means 32 to inverted position with their stem ends 22 uppermost, see FIG. 6 of the drawings, before the stem ends 22 are grasped by the clamping jaw means 21.

As may best be seen in FIG. 3 of the drawings, the slicing means 24 utilizes a plurality of straight knife blades 26 angularly related to each other to provide a plurality of angularly related slices through the major portion 23 of the fruit or vegetable so as to afford a plurality of spears 34 of similar size and shape suitable for packing and freezing.

As shown in FIGS. 1, 3, and 4 of the drawings, the conveyor means 32 is in the form of a first elongated segmented table top type conveyor 36 formed for receiving and transporting individual vegetables and fruits resting on their major portions 23 from a receiving station A to a transfer station B, together with a second elongated segmented table top type conveyor 37 extending from a position laterally spaced from the first conveyor 36 at the receiving station A to a position spaced generally above the first conveyor 36 at the transfer station B for accomplishing lateral erecting of the individual vegetables and fruits as they approach the transfer station B.

The segments 39 of conveyor 37 are capable of movement relative to each other, in the manner shown in FIG. 3. As the conveyors 36 and 37 move along in synchronism, conveyor 37 is shifted sideways and upwardly from the position generally laterally spaced from conveyor 36, shown in FIG. 5, to the position overlying and laterally spaced above conveyor 36, as illustrated in FIG. 6. This causes the fruit or vegetable to be swung from the lying down position of FIG. 5 to the erected position of FIG. 6.

As illustrated in FIGS. 1, 3, 4, 7, 8, and 9, the erecting means 33 here includes articulated finger means positioned to extend between the conveyor 36 and 37 at a location between the receiving station A and the transfer station B, the finger means 41 being formed for aligning each of the individual vegetables and fruits with its longitudinal axis upright and its stem end on top as it passes by. An alternate form of erecting means 33, in the form of wedges 35 carried at the proper spacing on conveyor 36, may be utilized instead of finger means 41 to simplify the design.

The elongated conveyor 37 is formed with a plurality of V-shaped notches 42 facing toward the first elongated belt conveyor 36 and adapted for receiving and removably supporting the stem ends of individual vegetables and fruits during movement thereof from the receiving station A to the transfer station B. Flexible driven belt means 43 and associated guide member 40 extend horizontally longitudinally of the conveyor 37 from a position upstream of and overlying the articulated finger means 41 to the transfer station B, the flexible driven belt means 43 being cooperative with the V-shaped notches 42 to press laterally against opposite sides of the vegetables and fruits for further aligning and holding them in correctly spaced upright, inverted position on the first elongated belt conveyor 36 as they move to the transfer station B.

The clamping jaw means 21 provides an opposed pair of clamping jaw members, 57 and 58 actuated by rotation of the turntable 29 for lateral clamping movement against opposite sides of the stem ends 22 of the individual vegetables and fruits at the transfer station B. Cooperative with jaw members 57 and 58 are a pair of aligning jaws 46 formed for lateral movement toward each other against opposite sides of the major portion 23 of the individual vegetables and fruits for holding same in upright inverted position as the clamping jaw members engage the stem ends 22 and carry the vegetables and fruits to the slicing means 24.

In accordance with the present invention, and as an important feature thereof, the slicing means 24 is reciprocated vertically in response to rotation of the clamping jaw means 21 carried on the turntable 29 through a slicing station C angularly displaced from the transfer station B. Camming means 47 is provided on the slicing means 24 for effecting vertical reciprocation of each of the slicing means 24 as they are carried on the turntable 29 through the slicing station C.

The cutting means 27 is provided in the form of a sharp edged circular blade rotatable in a horizontal plane and positioned to intercept the individual vegetables and fruits at a cutting station D for severing the sliced major portion 23 from the stem end 22 gripped by the clamping jaw means 21. The cutting means 27 is positioned just below the path of the clamping jaw means 21 and just below the upper ends of the vertical slicing cuts made in the major portion 23 by the knife blades 26. The blade 27 thus severs the sliced major portion 23 from the stem end 22 gripped by the clamping jaw means 21 at cutting station B, and the individual slices or spears 34 drop down through the slicing means 24 onto a suitable removal conveyor 30.

As here shown, the turntable 29 is mounted for rotation on a supporting frame 48 and is revolved at constant speed by the drive means 28 is synchronism with the movement of the conveyor means 32 and the operation of the erecting means 33, articulated finger means 41, and clamping jaw means 21. The turntable 29 is carried on and rotated by the central vertical shaft 31, which is journaled in frame 48 and is driven by drive means 28 through roller chain and sprocket means 49. The cutting means blade 27 is driven by drive means 28 from shaft 31 through a roller chain and sprocket means 50.

The machine of the present invention is particularly suited for slicing and trimming heads of broccoli into the spears 34. These broccoli heads have a central stalk terminating at one end in the stem end 22, with multiple florets (branches with clusters of the broccoli flower buds) at the opposite, flower end 23. Thus, the conveyor 36 receives and supports the flower ends 23 of the head of broccoli at the receiving station A and transports the heads of broccoli on their flower ends 23 to a transfer station B spaced along the conveyor 36 from the receiving station A.

The conveyor 37 has a portion which is laterally spaced from the conveyor 36 at the receiving station A and is spaced generally above conveyor 36 at the transfer station B. The conveyor 37 is formed for supporting the stem end 22 of the stalk remote from the flower end in such manner that movement of the broccoli heads along the conveyors from the receiving station A to the transfer station B erects each broccoli head laterally to an inverted position with the flower end 23 resting on the conveyor 36 and the stalk extending upwardly therefrom to its stem end 22.

The articulated finger means 41, or the wedge means 35, and the flexible belt means 43 are cooperative with the conveyors 37 and 38 and are formed for urging the broccoli stalk to vertical position as the head of broccoli moves toward the transfer station B. The articulated finger means 41 extends between the conveyors 36 and 37 and is formed for effecting fore and aft as well as lateral vertical alignment of the stalks as the head of broccoli moves toward the transfer station B. The flexible belt means 43 presses the broccoli stalks into the notches 42 to provide further vertical alignment as the head of broccoli moves to the transfer station B.

The clamping jaw means 21 is mounted on the turntable 29 for joint movement therewith. Preferably, a plurality of the clamping jaw means units 21 is provided in circumferentially spaced relation on the turntable 29, six clamping jaw means 21 being provided in the machine illustrated in the drawings, see FIG. 3. Each of these clamping jaw means 21 clamps onto the stem end of a broccoli stalk remote from the flower end 23 at the transfer station B, for supporting the head of broccoli depending therefrom in inverted position with its stem end 22 uppermost, as the turntable 29 moves the clamping jaw means 21 along a generally circular path.

The notches 42 are of V-shape and are formed in the cantilevered ends of a plurality of flat, rectangular blocks 51 attached in evenly spaced relation along the conveyor 37 with the spacing coinciding with the spacing between the clamping jaw means units 21 for precise registry of the broccoli heads on the conveyor means 32 with each clamping jaw means 21. The blocks 51 also have horizontal grooves 52 formed in the cantilevered ends of the blocks 51. As shown in FIGS. 4, 5 and 6 of the drawings, the blocks 51 move upwardly and in the direction of the adjacent conveyor 36 as they progress towards the transfer station B.

The belt means 43 may best be seen in FIG. 4 of the drawings and includes a flexible belt of circular cross-section entrained on pulleys 53, 54 and 56, with the path of the belt 43 intersecting the paths of the grooves 52 in blocks 51 to urge the stalks of the heads of broccoli into the notches 42. The guide member 40 serves to press the broccoli stalk into the V-shaped notches 42 to further align the broccoli stalk so that its center is vertical and the stalk upper end is precisely located both longitudinally and laterally of the conveyor 37 for grasping by the clamping means 21.

Figure 11:
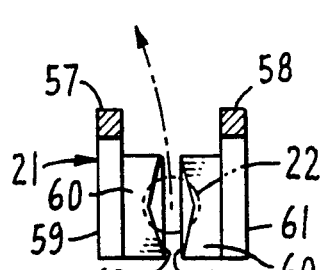
FIG. 11 is a horizontal cross-sectional view taken substantially on the plane of Line 11—11 of FIG. 10.

The clamping jaw means 21 in its relationship to the other parts of the machine may best be seen in FIGS. 1, 3 and 4 of the drawings. A preferred structure for the jaw clamping means 21 is illustrated in FIGS. 12, 13 and 14 of the drawings. As there shown, the clamping jaw means 21 is provided in the form of a pair of jaw members 57 and 58 having lower end portions 59 and 61 extending horizontally, with thin sharpened plates 62 and 63 respectively extending in horizontally confronting relation to each other from the bottoms of horizontal V-shaped blocks 60 carried on supporting ends 59 and 61 of the jaw means 57 and 58. As shown in FIG. 11, the blocks 60 bear against the opposite sides of the broccoli stalk and prevent the sharpened plates 62 and 63 from cutting therethrough while, at the same time, further precisely aligning the center of the stalk with the center of slicing means 24.

The jaw members 57 and 58 are pivotally mounted by means of studs 64 and 66 on jaw members 57 and 58, respectively. The jaw members 57 and 58 are positioned fairly closely together, as shown in FIG. 12, and short actuating arms 67 and 68 are attached to and extend from the jaw members 57 and 58 toward each other. The ends of the arms 67 and 68 overlap and are provided with registering opening 69 through which is slidably engaged a vertical pin 71 in such manner that horizontal movement of pin 71 causes the jaw members 57 and 58 to move between open and closed positions, as shown by phantom lines and solid lines, respectively, in FIG. 12.

Pin 71 is mounted on the end of a horizontally extending arm 72 which has its other end connected to a vertical stub shaft 73. The upper end of shaft 73 is secured to a laterally extending arm 74 carrying a cam follower roller 76 at its other end. A tension spring 77 urges the roller 76 against a fixed cam surface 78 supported by frame 48.

When the rotation of the turntable 29 causes the jaw means 21 to reach the transfer station B, the cam follower rolls off of the end 79 of the cam surface 78 to the position shown in FIG. 12 of the drawings where the spring 77 pulls on arm 74, causing it to rotate around the shaft 73. This, in turn, causes arm 72 to swing to the position shown in solid lines in FIG. 12 and pin 71 acts through arms 67 and 68 to swing the jaw members 57 and 58 about the studs 64 and 66 to the position shown, where the sharpened plates 62 and 63 and their blocks 60 are clamped tightly against the opposite sides of the stem end 22 of the heads of broccoli.

The jaw members 57 and 58 remain in this clamped position as the clamping jaw means 21 progresses around the turntable past the cutting station D, where the cam surface 78 again engages the follower 76 to move the jaw members 57 and 58 to the open position shown in phantom lines in FIG. 12 of the drawings. The point at which cam surface 78 again engages cam follower roller 76 is here identified as discard station E, where the severed stem ends are released from the jaw means 21 and drop into a chute (not shown) leading to a conveyor, container, or the like.

Figure 8:
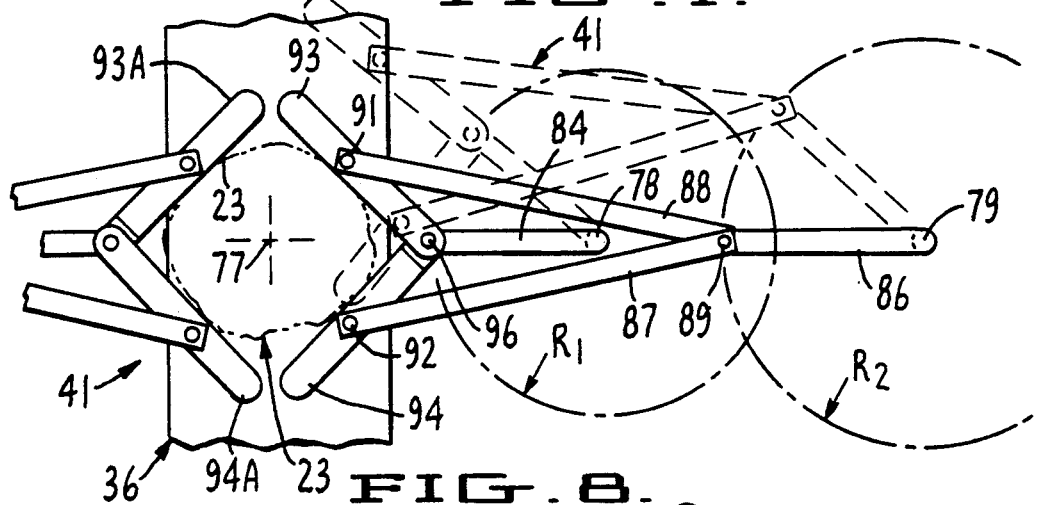
FIG. 8 is a plan view of articulated finger means shown in FIG. 7 of the drawings.
Figure 9:
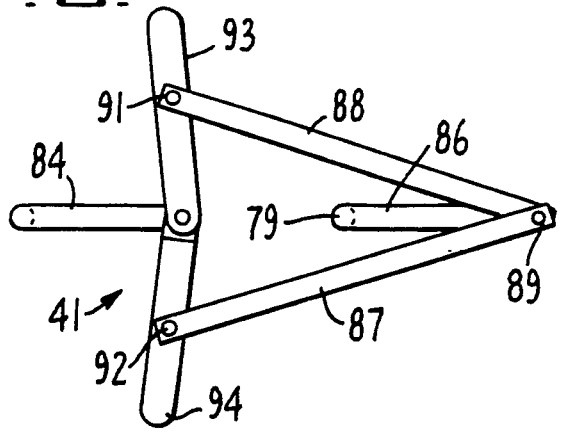
FIG. 9 is an enlarged fragmentary detail view of a portion of the articulated fingers of FIG. 8 shown in an open position.
Figure 10:
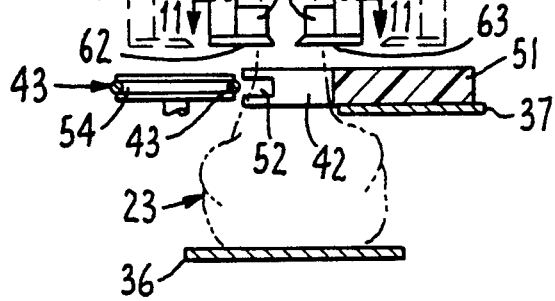
FIG. 10 is a vertical cross-sectional view taken transversely through the conveyors of FIG. 4 at a transfer station and illustrating the manner in which the upper stem end of a head of broccoli is mechanically grasped by jaw means.

The structure of the articulated finger means 41 is shown in FIGS. 7, 8 and 9 of the drawings, with the finger means 41 being mounted in operative position to extend between the horizontal conveyors 36 and 37 so they can press laterally from both sides against the flower end 23 in such manner as to align the longitudinal center line 77 of the head of broccoli vertically, both longitudinally and laterally of the conveyors 36 and 37. A pair of vertical shafts 78 and 79 are journaled on a bracket 81 secured to frame 48 and are rotated in synchronism with each other by means of a roller chain and sprocket assembly 82, shaft 79 being driven by the drive means 28 through chain and sprocket means 83. Elongated arms 84 and 86 are secured to the upper ends of shafts 78 and 79 so that the distal ends of arms 84 and 86 describe horizontal circles indicated in FIG. 8 as $R_1$ and $R_2$.

A pair of connecting links 87 and 88 are pivoted on the distal end of arm 86. The opposite ends of the links 87 and 88 are pivotally connected at 91 and 92 to fingers 93 and 94 approximately midway therealong. Fingers 93 and 94 are pivoted to each other and to arm 84 at 96. These components are sized so that the fingers 93 and 94 match both the position and speed of the broccoli at the point of engagement.

Confronting fingers 93 and 94 are similar to fingers 93A and 94A, the construction of which is a mirror image of the construction of fingers 93 and 94 and their drive mechanism.

The sets of fingers 93 and 94, 93A and 94A, are moved toward and away from each other laterally of the conveyor 36 in synchronism with the movement of the heads of broccoli along the conveyor so that the major portion 23 of the broccoli is engaged between the sets of fingers and is moved both longitudinally and laterally of the conveyor to the inverted erect position illustrated in FIG. 7, with the longitudinal axis of the broccoli vertical.

As may best be seen in FIGS. 15, 16 and 17 of the drawings, the aligning jaws 46 are carried on the turntable 29 in position to clamp laterally against the flower end 23 of a head of broccoli to hold the head of broccoli steady as the stem end 22 is grasped between the jaw members 57 and 58 of the jaw means 21 and carried to slicing means 24. The jaws 46 are pivoted to swing in a vertical plane on a stub shaft 96 carried on a circular plate 97 mounted on the central vertical shaft 31.

Swinging movement of the arms 46 toward and away from each other is accomplished by a cam follower roller 98 engageable with a camming surface 99 positioned in the path of the cam follower 98 on the frame 48 of the machine. Cam follower 98 is journaled at 101 to the top of a plunger member 102 slidable vertically through the turntable 29, with the plunger member 102 being urged upwardly by a compression spring 103. A block 104 at the lower end of plunger 102 is connected by links 106 to the aligning jaws 46 so that downward movement of the plunger 102 under the influence of cam 99 and follower 98 swings the jaws 46 to the closed position illustrated in FIG. 16. Opposed angled stub fingers 107 and 108 are mounted on the distal ends of the aligning jaws 46 in position to grasp the major portion 23 of the head of broccoli. When the end of cam surface 99 is reached, cam follower roller 98 moves upwardly under the influence of spring 103, pulling the jaws 46 open to the position illustrated in FIGS. 1 and 13 of the drawings. Camming surface 99 is mounted on the frame 48 by means of compression springs 100 to allow reaction to different diameters of broccoli.

Figure 18:
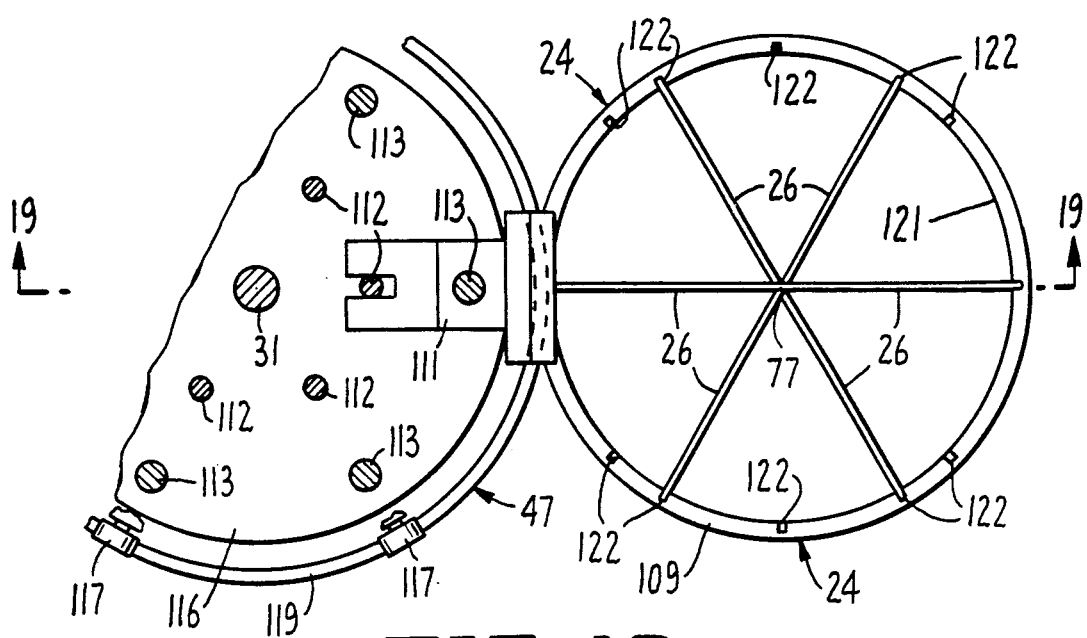
FIG. 18 is a plan view of a slicing knife assembly vertically reciprocable beneath the jaw means of FIG. 14.

In accordance with the present invention, the slicing means 24 is reciprocated vertically in alignment with the vertical axis 77 of the head of broccoli depending from jaw means 21. As may best be seen in FIGS. 18 and 19 of the drawings, the slicing means 24 preferably includes a cylindrical ring 109 having a plurality of the flat, sharpened blades 26 extending diametrically thereacross in angular relation to each other, three such blades 26 being shown in FIG. 18 to provide three vertical slicing cuts through the major portion 23 of the head of broccoli so as to ultimately provide six broccoli spears 34 of similar size and shape.

Other numbers of blades 26 may be used to make corresponding numbers of cuts. For example, small heads of broccoli may required only four longitudinal cuts made by two of the blades 26, while very large heads of broccoli may require as many as eight cuts made by four of the blades 26, to produce the desired size of spears. The number of blades 26 can be changed quickly to adjust the slicing means to different size ranges of broccoli heads. For this purpose, the inner face 121 of ring 109 is provided with diametrically opposed vertical grooves 122 into which the opposite ends 123 and 124 of the blades 26 are dropped. The grooves 122 terminate above the bottom of the ring 109 so as to support the blades 26 with their upper sharpened edges at about the level of the top of the ring 109.

Figure 25:
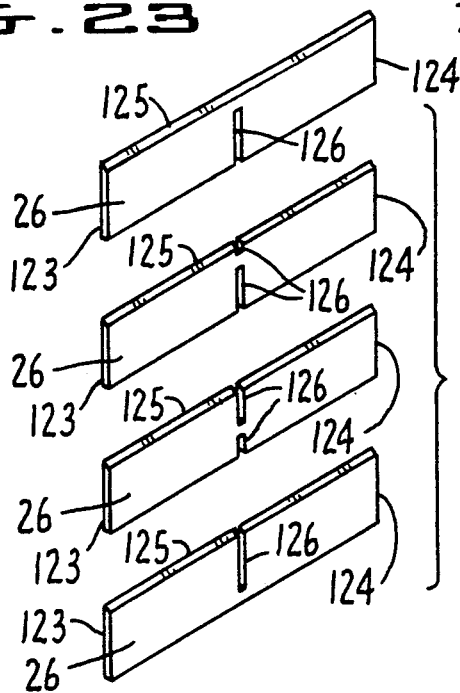
FIG. 25 is a perspective view of a set of four blades mountable in the support ring.

The blade ends 123 and 124 are easily and quickly slidable upwardly out of the grooves for sharpening the blades 26 or changing the number and configuration of the blades 26 in the ring 109. The blades 26 are formed with notched or relieved portions 126 midway between their ends 123 and 124, in the manner shown in FIG. 25 of the drawings, to accomodate up to three other blades 26 where they cross at the center of the ring 109.

Figure 19:
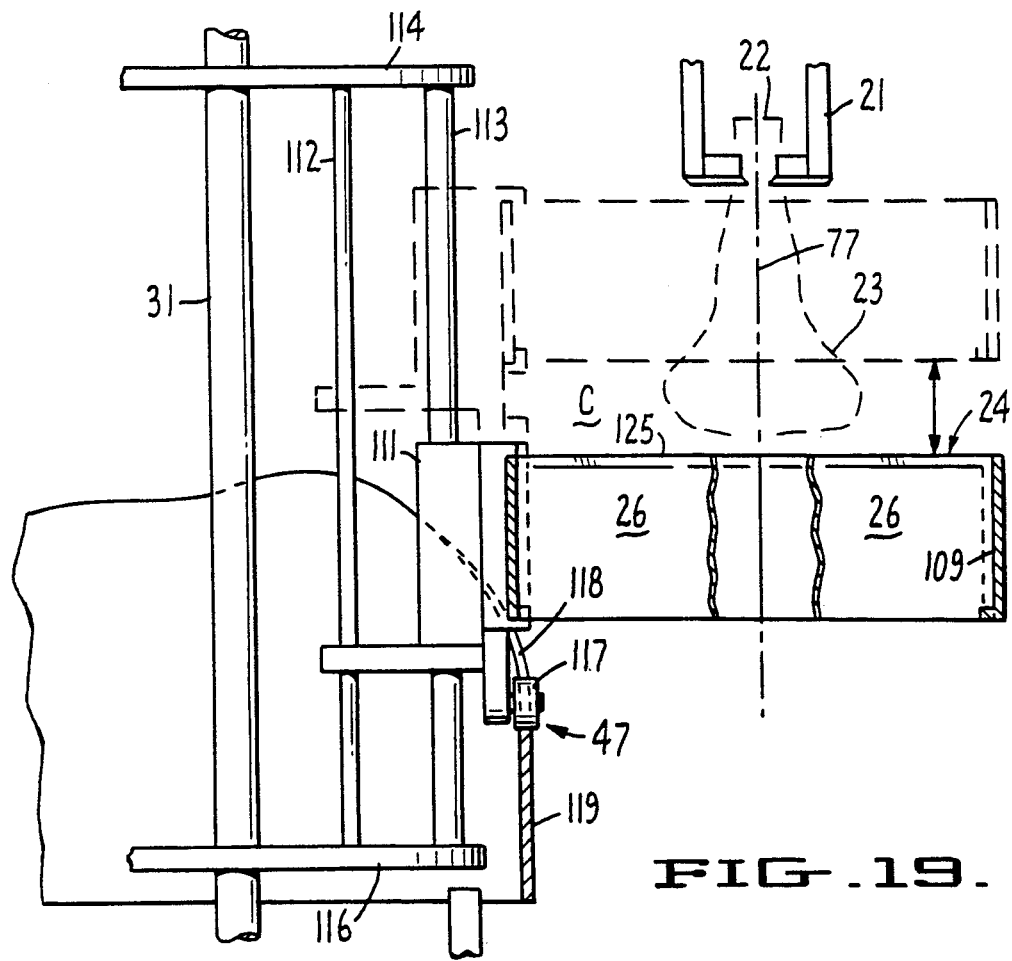
FIG. 19 is a vertical cross-sectional view taken substantially on the plane of Line 19—19 of FIG. 18.
Figure 20:
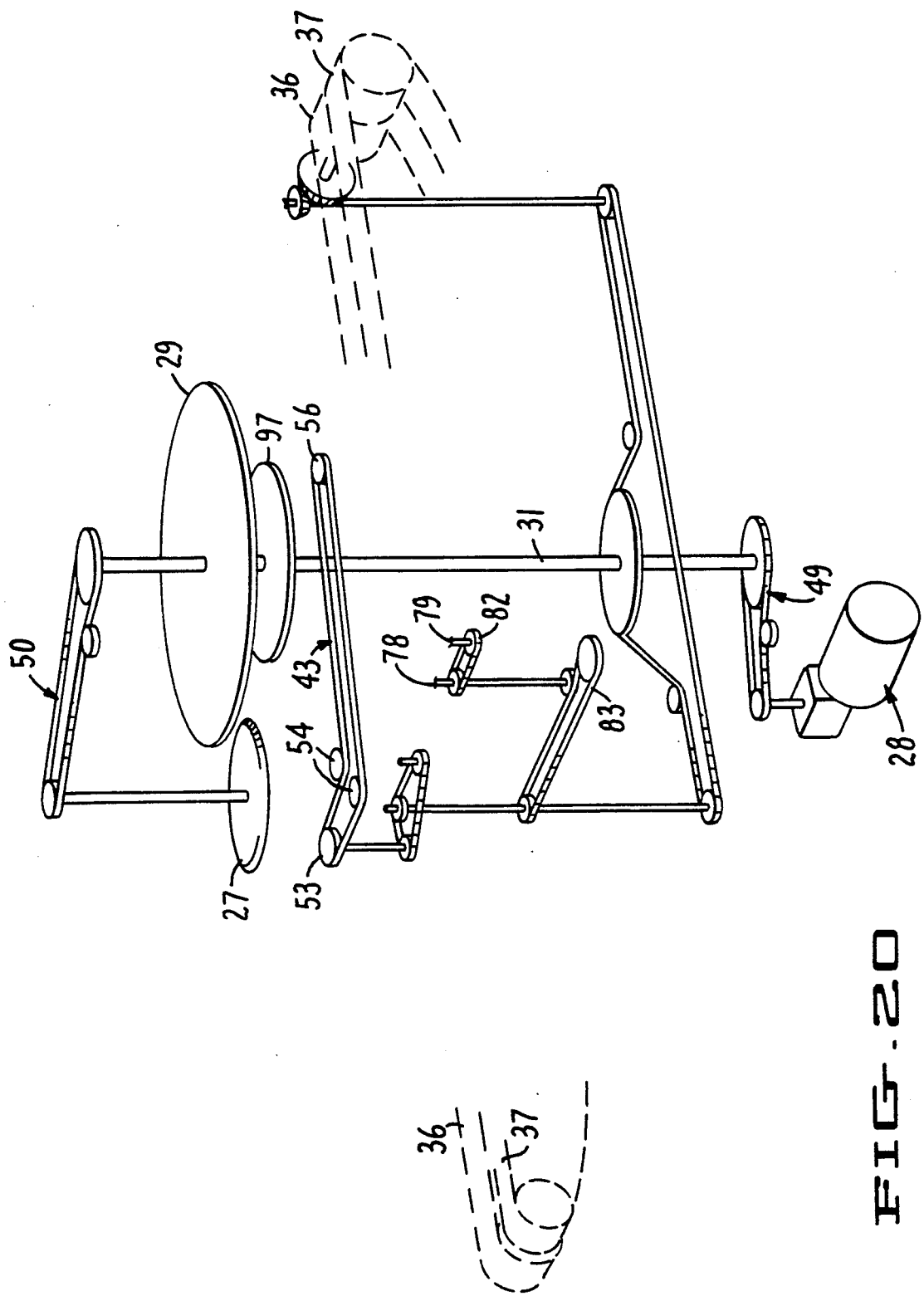
FIG. 20 is a diagrammatic perspective view of synchronized drive systems for the interacting components of the machine of FIG. 1.
Figure 21:
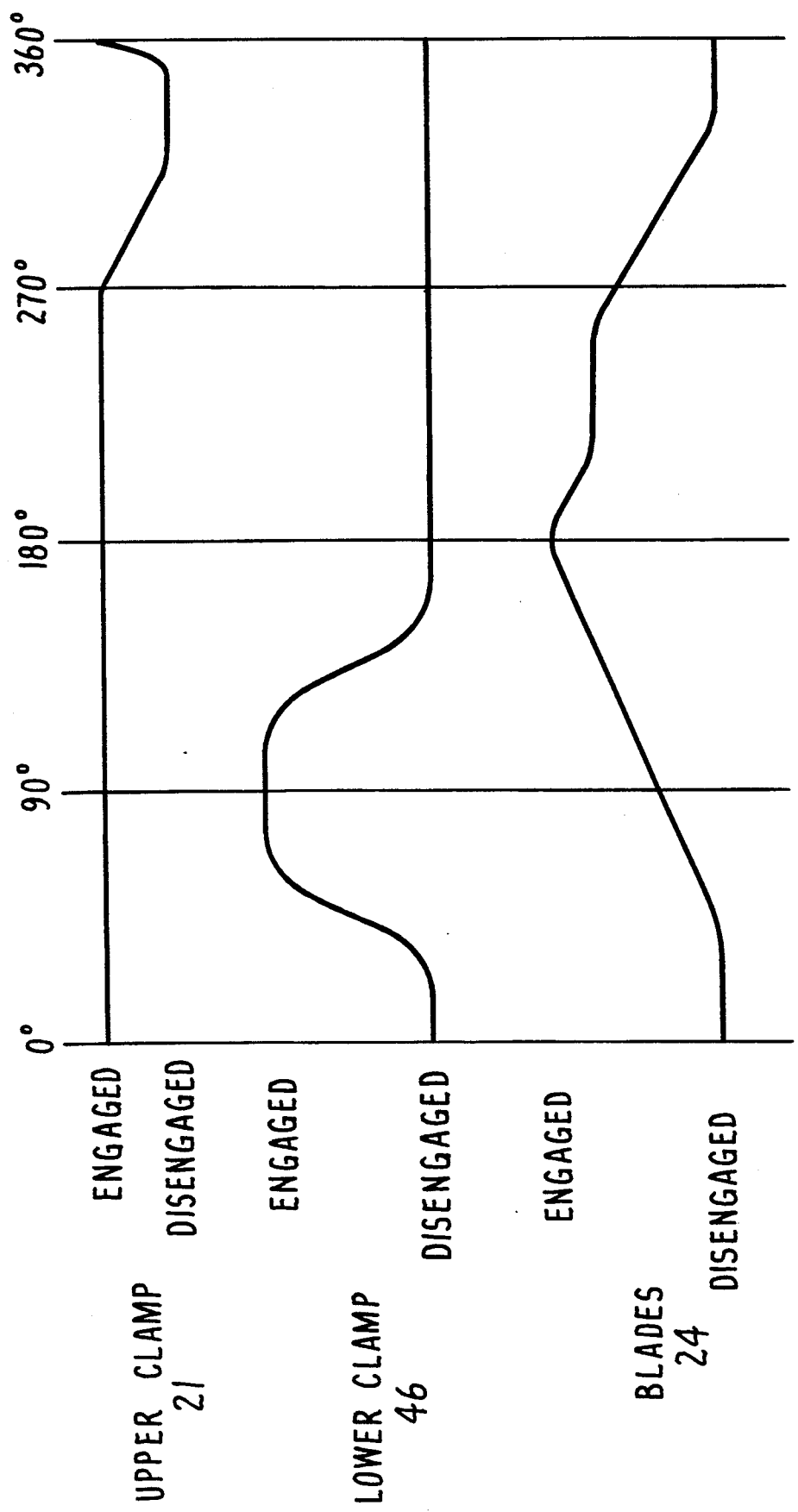
FIG. 21 is a timing diagram showing synchronous operation of portions of the machine.
Figure 22:
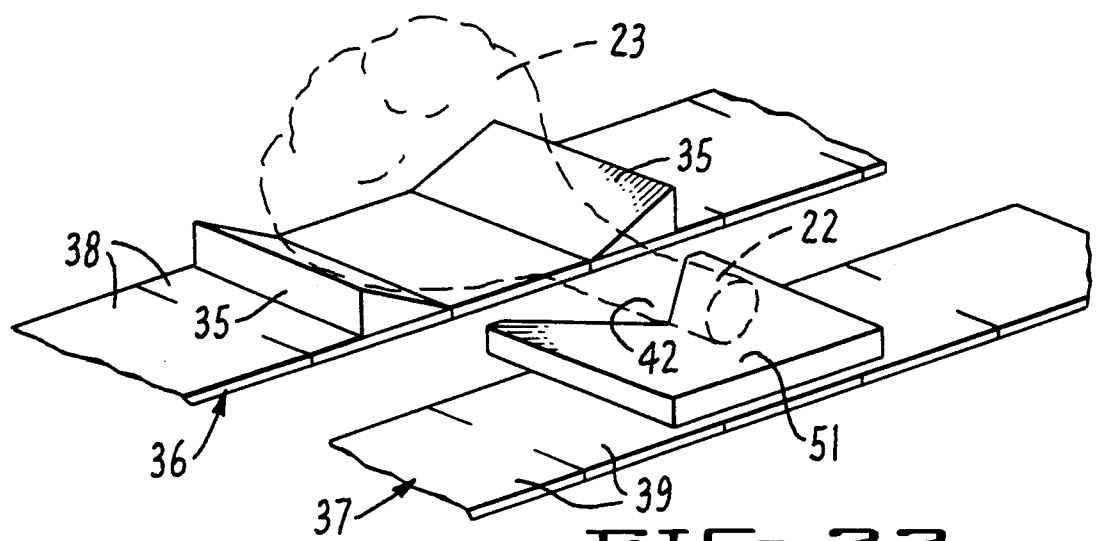
FIG. 22 is an enlarged fragmentary perspective view of a modified form of aligning means.
Figure 23:
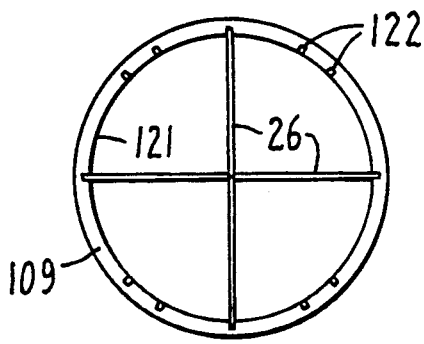
FIG. 23 is a plan view of a pair of slicing blades removably mounted in a support ring for slicing a head of broccoli or the like into quarters.
Figure 24:
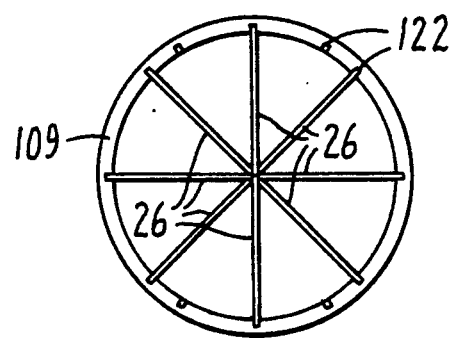
FIG. 24 is a view similar to that of FIG. 23 but showing three blades removably mounted in the support ring for slicing a head of broccoli or the like into six similar spears.

As shown in FIG. 19 of the drawings, the sharpened upper edges 125 of the blades 26 and the upper edge of ring 109 are positioned below the head of broccoli at the transfer station. The ring 109 and blades 26 are moved upwardly at slicing station C until the upper edges of the blades 26 and ring 109 are just below the bottom of the jaw means 21 where it grips the stub end 22 of the head of broccoli.

The described vertical movement of ring 109 and blades 26 from the lower position illustrated in solid lines in FIG. 19 to the upper portion illustrated in dashed lines in FIG. 19, is accomplished by removably securing ring 109 to a block member 111 which is vertically slidable on spaced guide rods 112 and 113 extending vertically between members 114 and 116 secured to central shaft 31 for rotation therewith.

A cam follower roller 117 rides on a cam surface 118 on the upper edge of a generally cylindrical member 119 fixedly supported on frame 48 in concentric relation to the shaft 31. As the camming surface 118 rises relative to the turntable 29, the follower roller 117 riding thereon forces the block 111 and ring 109 upwardly to the desired height as determined by the height of the cam surface 118 at the slicing station C. The ring 109 continues at nearly this height through the cutting station D so the individual spears fall through the spaces between the blades 26 when severed from the stem end 22 by the blade 27.

Figure 26:
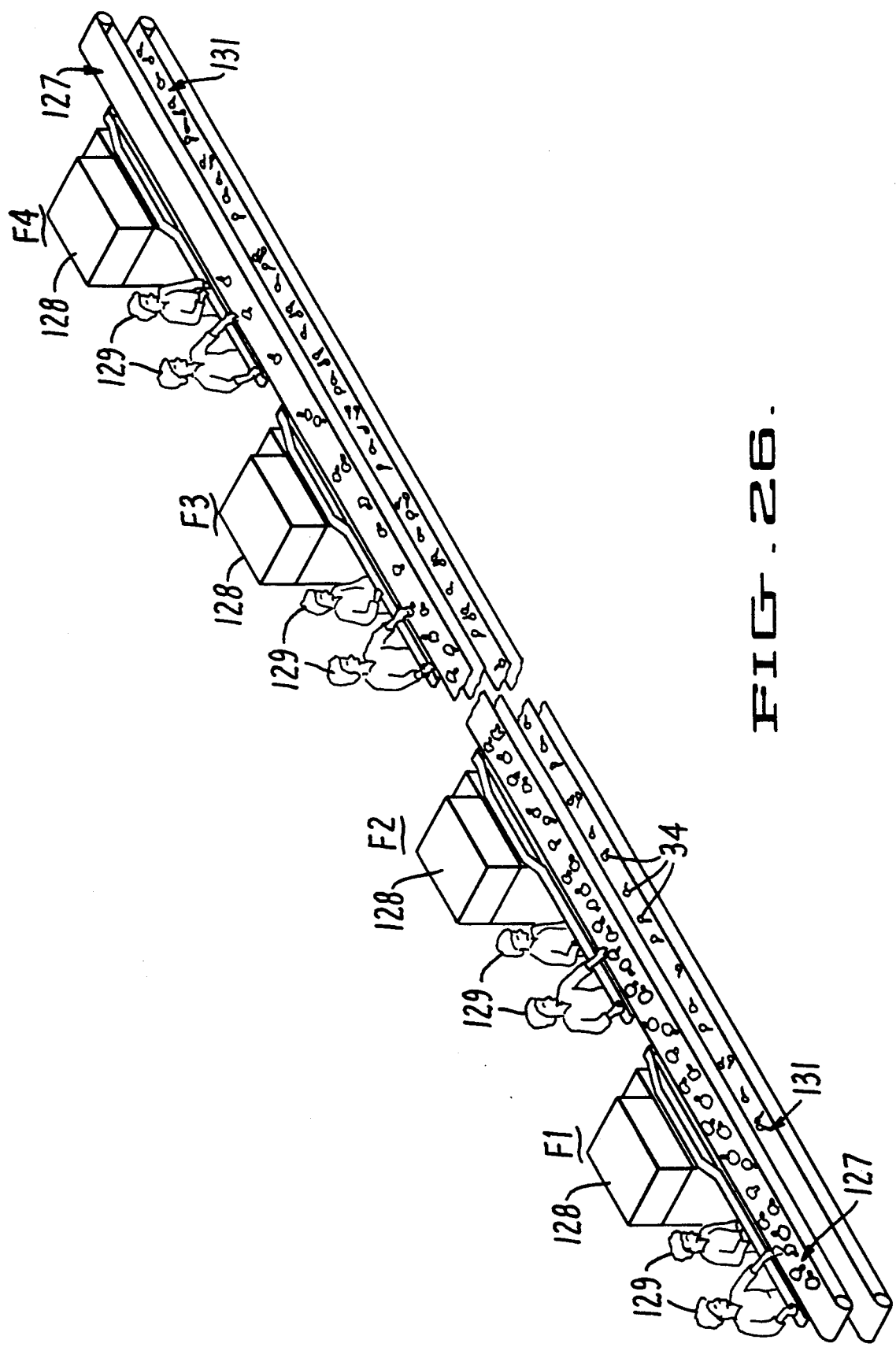
FIG. 26 is a perspective view of the components of the system of the present invention.

A typical embodiment of the system of the present invention is illustrated in FIG. 26 of the drawings. As there shown, an elongated supply belt conveyor 127 receives intermixed heads of broccoli of different sizes and transports them past a plurality of workstations F spaced along the conveyor 127. A plurality of the broccoli slicing machines 128 of the present invention are positioned alongside the supply conveyor 127 at the workstations F, with each of the slicing machines 128 having feed conveyor means 32 adapted for receiving heads of broccoli transferred manually, as by workers 129, from the supply conveyor 127. Each of the broccoli slicing machines 128 is formed for slicing heads of broccoli in predetermined size ranges into spears, and the workers 129 at each slicing machine transfer the heads of broccoli in the size range for which their slicing machine is adjusted.

The workers 129 select the broccoli heads of correct size range from the supply conveyor 127 and place them on their machines feed conveyors 32 for automatic transporting through the slicing machines 128 and slicing into the desired spears. With a plurality of the slicing machines 128 along the supply conveyor 127, all of the ranges of sizes of broccoli heads can be processed effectively. The sliced spears 34 from the slicing machines 128 are automatically deposited on a product belt conveyor 131 for delivery to the packaging and freezing operations. While only four of the workstations, F1, F2, F3 and F4, are depicted in FIG. 26 of the drawings, it should be apparent that other numbers of workstations can be used to conform to the characteristics of the broccoli being processed.

From the foregoing, it should be apparent that the system, method and apparatus of the present invention is well adapted for slicing vegetables and fruits into spears of similar size and shape suitable for packing and freezing, the apparatus being particularly useful for slicing non-symmetrical and non-uniform vegetables such as heads of broccoli and the like.

What is claimed is:

1. The method of slicing fruits and vegetables lengthwise into spears of similar size and shape, comprising the steps of
   inverting the fruit or vegetable with its stem end uppermost,
   mechanically grasping said stem end with a major portion of the fruit or vegetable depending vertically therefrom,
   continuously conveying said fruit or vegetable along a predetermined path at a constant speed,
   conveying a sharp knife blade along a predetermined path just below said predetermined path of said fruit or vegetable,
   urging said sharp knife blade upwardly to vertically slice said major portion into spears while said fruit or vegetable and said knife blade are moving along their predetermined paths at the same speed and in registry with each other,
   cutting horizontally through said fruit or vegetable at the upper end of the vertical slice made by said knife blade for separating the sliced major portion from said stem end, and thereafter releasing said stem end.

2. The method as described in claim 1, and wherein a plurality of radially intersecting knife blades are forced upwardly through said major portion of said vegetables and fruits to slice same into spears of approximately equal size.

3. The method of forming a head of broccoli having multiple florets on a central stalk into comparatively uniform spears suitable for freezing, comprising the steps of
   inverting the head of broccoli with its stem end uppermost and its flower end and stalk depending therefrom,
   grasping said stem end,
   continuously conveying said head of broccoli along a predetermined path at a constant speed,
   conveying multiple sharp knife blades synchronously with said head of broccoli along a predetermined path at constant speed,
   urging said multiple sharp knife blades upwardly while said head of broccoli is moving along said path so as to slice vertically through said flower end and stalk and divide same into comparatively uniform spears,
   cutting laterally through said stalk below said stem end so as to separate said spears from said stem end, and thereafter releasing said stem end.

4. The method as described in claim 3, and wherein said head of broccoli and said multiple sharp knife blades are mounted on a constantly rotating turntable for moving said sharp knife blades and said head of broccoli along said synchronous predetermined path at constant speed.

* * * * *